US012649503B2

(12) United States Patent
Korneev et al.

(10) Patent No.: US 12,649,503 B2
(45) Date of Patent: Jun. 9, 2026

(54) METHODS AND SYSTEM FOR PROVIDING HIGH-SPEED COMMUNICATION ON HIGH-SPEED RAILWAY

(71) Applicant: OBSHHESTVO S OGRANICHENNOJ OTVETSVENNOSTYU "DOK", Sankt-Petersburg (RU)

(72) Inventors: Daniil Olegovich Korneev, Sankt-Petersburg (RU); Sergei Vladimirovich Petrov, Sankt-Petersburg (RU); Ilia Viktorovich Korobeikin, Sankt-Petersburg (RU); Daniil Alekseevich Popov, Sankt-Petersburg (RU); Vitalii Evgenevich Losev, Sankt-Petersburg (RU); Dmitrii Nikolaevich Trefilov, Votkinsk (RU)

(73) Assignee: OBSHHESTVO S OGRANICHENNOJ OTVETSVENNOSTYU "DOK", Sankt-Petersburg (RU)

( * ) Notice: Subject to any disclaimer, the term of this patent is extended or adjusted under 35 U.S.C. 154(b) by 389 days.

(21) Appl. No.: 18/028,541

(22) PCT Filed: Dec. 17, 2021

(86) PCT No.: PCT/RU2021/050440
§ 371 (c)(1),
(2) Date: Mar. 26, 2023

(87) PCT Pub. No.: WO2022/131968
PCT Pub. Date: Jun. 23, 2022

(65) Prior Publication Data
US 2023/0356761 A1 Nov. 9, 2023

(30) Foreign Application Priority Data
Dec. 18, 2020 (RU) .......................... RU2020141840

(51) Int. Cl.
*H04L 5/14* (2006.01)
*B61L 3/12* (2006.01)
*H04B 7/26* (2006.01)

(52) U.S. Cl.
CPC ........... *B61L 3/125* (2013.01); *H04B 7/2621* (2013.01); *H04L 5/14* (2013.01)

(58) Field of Classification Search
CPC ...... B61L 3/125; B61L 15/0027; B61L 27/70; B61L 15/0018; H04B 7/2621; H04L 5/14;
(Continued)

(56) References Cited

U.S. PATENT DOCUMENTS 10,281,313 B2 * 5/2019 Schultheiss ............... G01S 7/35
10,292,058 B2 5/2019 Ansari et al.
(Continued)

FOREIGN PATENT DOCUMENTS

CN 102104410 A 6/2011
CN 106357308 1/2017
(Continued)

*Primary Examiner* — Kibrom T Hailu

(57) ABSTRACT

The present invention relates to the field of communications, and more particularly to methods and a system for providing high-speed communications on a high-speed railway. The technical result is a better quality communication channel provided by train-to-ground radio relay links. The claimed system for providing high-speed communications on a high-speed railway comprises an internal and an external data exchange network. The internal network unites tail-end radio frequency modules mounted in the rear part of a train and equipped with narrow-band antennae, head-end radio frequency modules mounted in the front part of the train and equipped with narrow-band antennae, and switching equip-
(Continued)

Figure 1A:
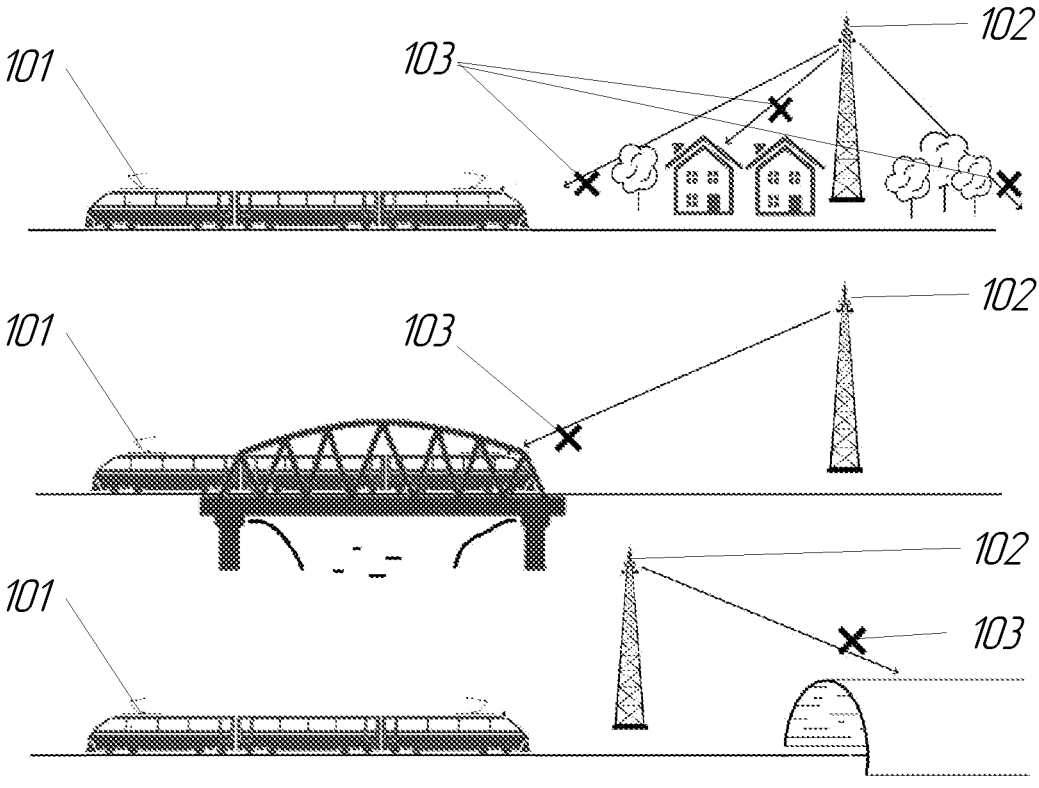

ment capable of processing signals from said modules and of providing network devices connected to said equipment with access to the external data exchange network. The external data exchange network unites base stations equipped with narrow-band antennae, said base stations being capable of establishing communication with the tail-end and head-end radio frequency modules in the train and being arranged in proximity to the railway clearance along the path of travel of the train. The antennae of the base stations and of the radio frequency modules in the train are configured to radiate radio waves in a short millimeter wave band.

14 Claims, 12 Drawing Sheets

(58) Field of Classification Search
CPC ..... H04W 84/005; H04W 4/42; H04W 88/04; H04W 76/14; H04W 76/15
See application file for complete search history.

(56)                References Cited

U.S. PATENT DOCUMENTS

| | | | | |
|---|---|---|---|---|
| 11,152,985 | B1 * | 10/2021 | Legg ..................... | H04B 7/0408 |
| 2013/0170409 | A1 * | 7/2013 | Ihm ...................... | H04B 7/2615 |
| | | | | 370/344 |
| 2015/0092676 | A1 * | 4/2015 | Periyalwar ........... | H04W 76/15 |
| | | | | 370/329 |
| 2016/0241367 | A1 * | 8/2016 | Irmer .................. | H04W 64/006 |
| 2016/0249233 | A1 * | 8/2016 | Murray .................. | B61L 27/70 |
| 2016/0255310 | A1 * | 9/2016 | Min'Kovskiy ......... | B61L 27/40 |
| | | | | 386/224 |

FOREIGN PATENT DOCUMENTS

| | | |
|---|---|---|
| RU | 2294298 C1 | 2/2007 |
| WO | 2015059496 A1 | 4/2015 |

* cited by examiner

<u>*300*</u>

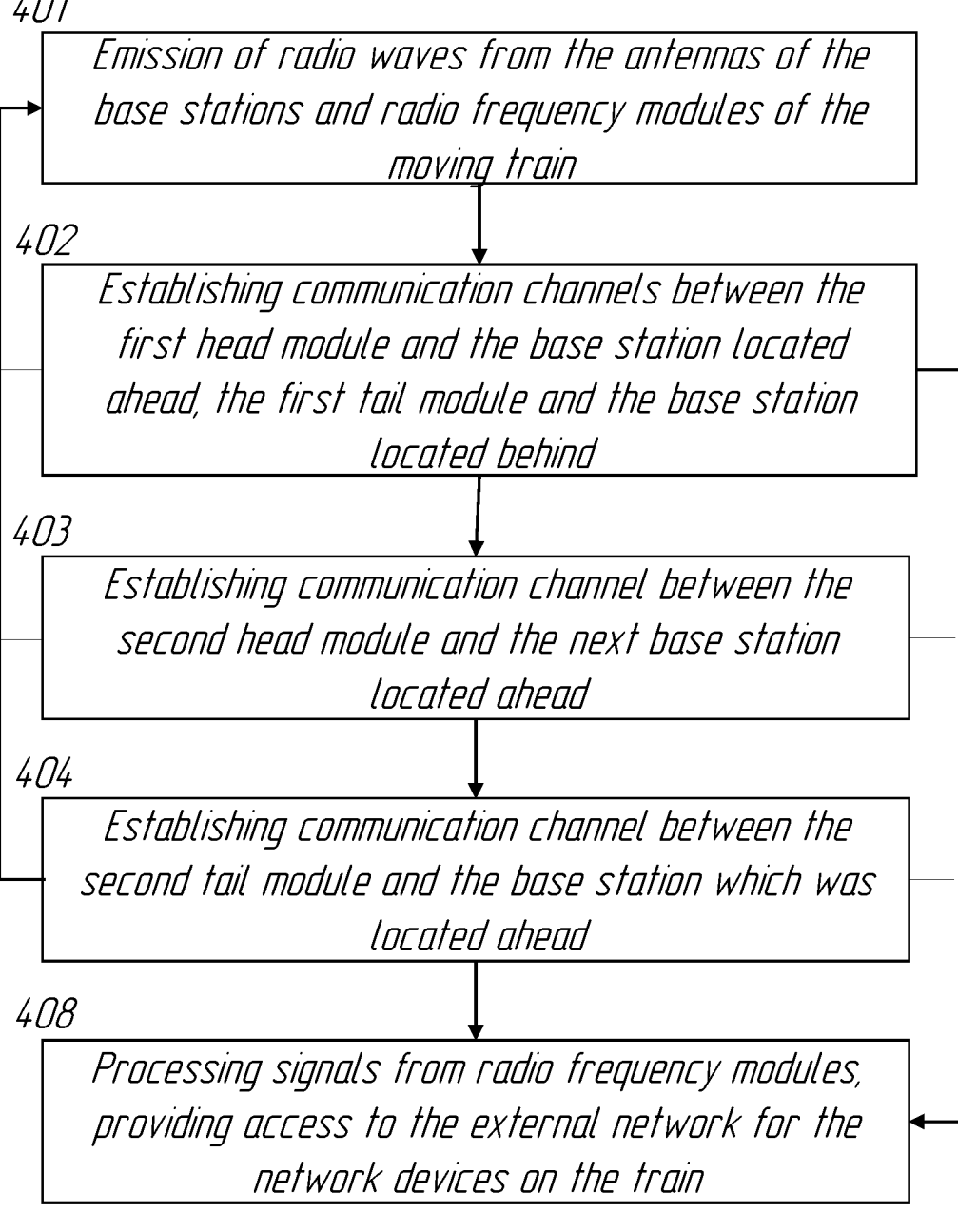

401
Emission of radio waves from the antennas of the base stations and radio frequency modules of the moving train 402
Establishing communication channels between the first head module and the base station located ahead, the first tail module and the base station located behind 403
Establishing communication channel between the second head module and the next base station located ahead 404
Establishing communication channel between the second tail module and the base station which was located ahead 408
Processing signals from radio frequency modules, providing access to the external network for the network devices on the train

Fig.4a

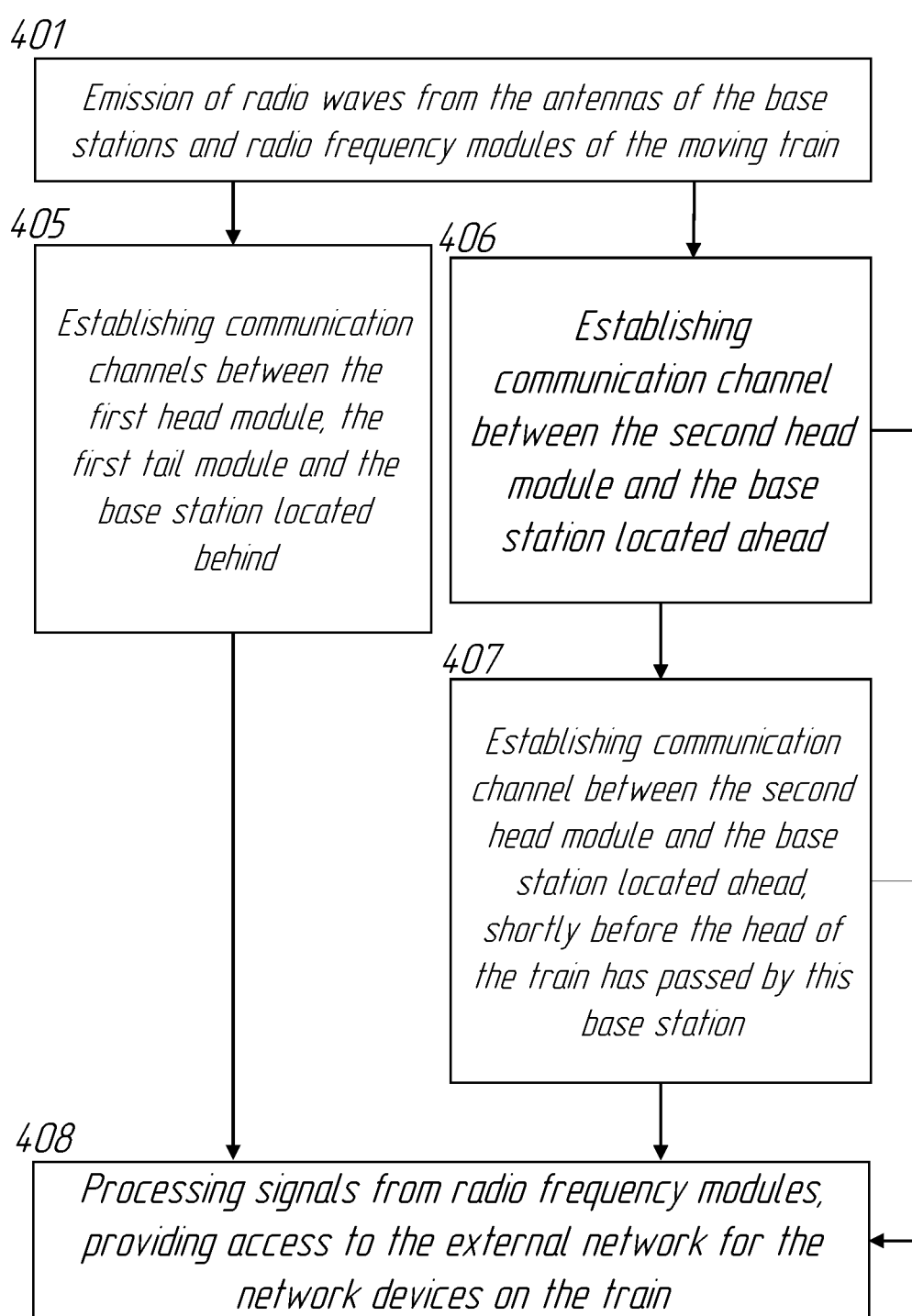

*401*

Emission of radio waves from the antennas of the base stations and radio frequency modules of the moving train

*405*

Establishing communication channels between the first head module, the first tail module and the base station located behind

*406*

Establishing communication channel between the second head module and the base station located ahead

*407*

Establishing communication channel between the second head module and the base station located ahead, shortly before the head of the train has passed by this base station

*408*

Processing signals from radio frequency modules, providing access to the external network for the network devices on the train

*Fig.4b*

METHODS AND SYSTEM FOR PROVIDING HIGH-SPEED COMMUNICATION ON HIGH-SPEED RAILWAY

FIELD OF INVENTION

This invention relates to the field of communication, and in particular to methods and system for providing high-speed communication on a high-speed railway. The invention can be used in networks of "train-to-ground" class.

PRIOR ART

There is a known system for providing communication on a high-speed railway, which is disclosed in the article "High-speed and handover-free communications for high-speed trains using switched WDM fiber-wireless system." (Dat, Pham Tien, et al. 2018 Optical Fiber Communications Conference and Exposition (OFC). IEEE, 2018.) The known system includes several remote antenna units connected to a base station, which receive signals transmitted over an optical fiber communication line generated in a centralized transceiver node and which are modulated by a radio frequency signal. Then these signals on the antenna unit are transferred to the millimeter frequency range and transmitted to a receiver installed on a moving train. To switch antennas between cells, through which the train passes in the course of its movement, fast-tunable lasers which change the signal wavelengths are introduced into the system. In the example described, two lasers are used, the first of which changes the signal wavelength to switch between the first and the third cell in the route of the train, and the second laser changes the signal wavelength to switch between the second and the fourth cell. The routing of signals intended for transmission to the train receiver is carried out using the technology of seamless spectral multiplexing of channels.

There is a known system for providing broadband Internet access in railway transport, which is disclosed in the patent for invention No. U.S. Pat. No. 10,292,058B2 (published on 14 May 2019, "Radio over fiber antenna extender systems and methods for high-speed trains"). The known system includes multiple antennas installed on the outer side of the train cars, multiple wireless access points installed inside the train cars, and a control system. The antennas are made capable of exchanging data with a cellular communication network. The antennas and access points are connected respectively to each other and to the control unit via fiber communication lines. The control system is made capable of establishing a communication channel with the base station, collecting data on the train speed and the time of reception and transmission of the signal between the train antennas and the base station. The control system is able to adapt data processing procedures basing on the named data.

There is a known method for providing communication with a network gateway installed on a vehicle, which is disclosed in patent application No. US20160249233A1 (published on 25 Aug. 2016, "Providing broadband service to trains"). The known method assumes that the said network gateway is configured to provide cellular radio communications to mobile devices of users inside the vehicle. To do this, the method provides for the presence of cellular coverage of the route passed by the vehicle. In this case, each cell of the network is designed to communicate with the said gateway, and the entire set of cells is configured in such a way as to provide communication between the vehicle gateway and the core cellular radio network.

However, despite the fact that the known inventions provide for the execution of program instructions designed to compensate for the loss of communication between the user and the base station due to the high-speed of the train, errors are possible in the data transmitted from the base station to the train and vice versa.

Besides, in order to calculate a model that compensates for noise in the transmitted data, it is necessary to use the train schedule, its speed throughout the route, take into account weather conditions, and lots of other factors. Such a model becomes extremely complex to implement and can hardly be used in networks designed to provide users on passenger trains with the Internet.

Also, in general, to ensure the possibility of connecting to the base station, its availability is necessary, which is not always possible along the entire route of the passenger train and is economically unprofitable due to lack of permanent subscribers along the route of the train. It is well known that trains mostly pass through uninhabited or sparsely populated areas.

Finally, using Long Term Evolution (LTE) technologies, it is currently impossible to provide a data transmission rate of up to 10 Gbps due to lack of frequency bands used in the implementation of this frequency coverage technology, in which data exchange at such a rate is possible. A channel with such a capacity between a base station and a moving train is possible if data is exchanged in the millimeter radio frequency range. However, in order to guarantee a data transmission rate up to 10 Gbps, it is necessary to comply with the condition of providing direct visibility between the base station and the moving train, which is an urgent technical task, given that the train is moving through an area with a significant number of natural obstacles hindering the wave propagation.

With regard to the use of W-Fi based technologies, they also currently have significant limitations for providing the Internet access on high-speed trains. The Wi-Fi signal is sensitive to Doppler shift. In practice, this means that the data transmission rate drops as the train speed increases. In addition, the Wi-Fi signal tends to fade quickly when the train moves from one access point to another. Cheap Wi-Fi technology becomes extremely expensive to provide broadband connectivity on high-speed trains, as it requires short distances between base stations installed along the train route.

There is a known radio relay communication system for high-speed railway, which is disclosed in the international publication of the application PCT No. WO2012097567A1 (published on 26 Jul. 2012, priority for application No. CN2011100205309A dated 18 Jan. 2011, "High-speed railway microwave communication network"). The known system includes multiple radio relay transceivers placed along the railway, radio relay transceivers mounted on a moving vehicle, wherein the said transceivers form a coverage area. At least one of the transceivers installed on the vehicle relays a radio signal between the device installed along the railway, which is included in the coverage area in the direction of the vehicle's movement, and the internal network of the vehicle. The frequency range of the radio signal corresponds to the range from 4 GHz to 42 GHz.

Disclosure of Invention

The technical problem in the grounds of this invention is to provide a broadband connection between a moving train and ground equipment for data exchange using the OSI/ISO network model by means of radio relay communication lines of train-to-ground class with data transmission rates from 2 to 10 gigabits per second.

The technical result achieved in the embodiment of this invention is to improve the quality of the communication channel provided by radio relay communication lines of train-to-ground class.

The first aspect of the invention discloses a method for providing high-speed communication on a high-speed railway, in which base stations combined into an external data transmission network are installed along the route of the train, equipped with narrow-band antennas and are capable of communicating with the head and tail radio frequency modules installed on the train, equipped with narrow-band antennas and combined into an internal data transmission network, while the location of the base stations relative to the railway gauge provides for direct visibility between the antennas of the base stations and the antennas of the radio relay modules installed on the train, and in this case the method includes the following steps:

emit radio waves in the range of short millimeter waves on the antennas of the base stations and the radio frequency modules of the moving train;

establish a communication channel between the first head module and the base station closest to it located ahead and a communication channel between the first tail module and the base station closest to it located behind;

before the train has passed by the base station located ahead, a communication channel is established between the second head module and the next base station closest to the train;

after the train has passed by the base station, which is located ahead of the train, a communication channel is established between the second tail module and this base station;

with the radio signals, the exchange of which is carried out through the established communication channels, processed on the switching equipment connected with the radio frequency modules, and the access of the network devices on the train to the external data exchange network is provided.

The additional advantages and essential features of this invention can be demonstrated in the following particular embodiments.

In particular, the antennas of the first and the second head modules are oriented in the direction of the base stations ahead of the moving train, and the antennas of the first and second tail modules are oriented in the direction of the base stations behind the train.

In particular, radio relay antennas of the base stations are tuned to emit narrow beamwidth waves.

In particular, the communication channels between the transceivers of the base stations and the transceivers of the radio relay modules of the train are set in full duplex mode with frequency and polarization multiplexing.

In particular, radio waves are emitted in one of the radio frequency bands selected from the group V-Band, E-Band, W-Band, F-Band, D-Band.

The second aspect of the invention discloses a method for providing high-speed communication on a high-speed railway, in which base stations combined into an external data transmission network are installed along the route of the train, equipped with narrow-band antennas and are capable of communicating with the head and tail radio frequency modules installed on the train, equipped with narrow-band antennas and combined into an internal data transmission network, while the location of the base stations relative to the railway gauge provides for direct visibility between the antennas of the base stations and the antennas of the radio relay modules installed on the train, and in this case the method includes the following steps:

emit radio waves in the range of short millimeter waves on the antennas of the base stations and the radio frequency modules of the moving train;

establish communication channels between the first head module, the first tail module and the base station closest to them located behind, while establishing a communication channel between the second head module and the nearest base station located ahead;

before the train has passed by the base station located ahead, a communication channel is established between the second tail module and this base station;

with the radio signals, the exchange of which is carried out through the established communication channels, processed on the switching equipment connected with the radio frequency modules, and the access of the network devices on the train to the external data exchange network is provided.

The second invention solves the technical problem also solved by the first invention. A particular embodiment of the second invention assumes that the antennas of the first head and first tail modules are oriented towards the base stations located behind the moving train, and the antennas of the second head and second tail modules are oriented towards the base stations located ahead of the train.

The third aspect of the invention discloses a method for providing high-speed communication on a high-speed railway, which includes an internal and external data exchange network, wherein:

the internal network combines tail radio frequency modules installed in the tail of the train, equipped with narrow-band antennas, head radio frequency modules installed in the head of the said train, equipped with narrow-band antennas, and switching equipment capable of processing signals from the said modules and providing access to an external data exchange network for network devices connected with this equipment;

an external data exchange network combines base stations with narrow-band antennas, wherein the base stations are capable of establishing communication with the tail and head radio frequency modules of the said train and are installed along the route of the train in such a way that the location of the base stations relative to the railway gauge provides for direct visibility between the antennas of the base stations and antennas of the radio relay modules installed on the train;

wherein the antennas of the base stations and the antennas of the radio frequency modules installed on the train are tuned to emit radio waves in the range of short millimeter waves.

The additional advantages and essential features of this invention can be demonstrated in the following particular embodiments.

In particular, the antennas of the first and the second head modules may be oriented in the direction of the base stations ahead of the moving train, and the antennas of the first and second tail modules may be oriented in the direction of the base stations behind the train.

In particular, the antennas of the first head and the first tail modules may be oriented in the direction of the base stations ahead of the moving train, and the antennas of the second head and second tail modules may be oriented in the direction of the base stations behind the train.

In particular, the base stations are placed on the supports of the railway overhead system.

In particular, the base stations are placed on the supports between the boundary of the railway gauge and nearest supports of the railway overhead system.

In particular, the base stations are networked by fiber-optic communication line.

In particular, each base station and each of the radio frequency modules installed on the train consists of several devices that provide switching, routing, reception and transmission of radio signals.

Performed analysis of patent and scientific and technical literature shows that the set of features of the present invention is not known from the prior art, therefore, there are reasons to believe that the invention meets the patentability requirement of "novelty".

In this case, no patent or other sources of information was found that would disclose the influence of the invention's distinctive features on the technical result they provide, i.e. it does not clearly follow from the prior art, for a professional opinion, and therefore, there are reasons to believe that the present invention meets the patentability requirement of "inventive level".

The invention can be implemented in practice, being based on known widespread and promising technologies, as well as the objective laws of physics, which testifies in favor of the fact that the invention meets the patentability requirement "industrial applicability".

In the present description, the term "radio frequency module" is mainly used to refer to the equipment installed on the train. It should be understood that such a node as radio frequency module is also used in the structure of base stations. To eliminate possible discrepancies, the description additionally provides for direct reference that the radio frequency module in question refers specifically to the base station. Otherwise, it should be taken as referring to the radio frequency module as part of the train data network equipment. The term "radio frequency module" does not refer to a complete separate communication device, but an assembly which consists of transceiving, routing, switching nodes, functionally combined together to form a single radio frequency module.

Besides, the text will additionally indicate that the radio frequency module includes a radio frequency transceiver. In this case, it should be understood that the term "radio frequency transceiver", indicating its ability to operate in radio frequency range, refers to an integral part of the tail or head radio frequency module installed on the train or the base station installed on the supports of the overhead system.

The term "railway gauge" means limiting transverse outline, perpendicular to the axis of the railway track, inside which, apart from the railway rolling stock, there must be no parts of structures and devices, as well as materials, spare parts and equipment located near the railway, except for parts of devices intended for direct interaction with the railway rolling stock (contact wires with fasteners, water crane hoses when filling with water, etc.), provided that the position of these devices inside the gauge space is linked to the corresponding parts of the railway rolling stock and that they cannot cause contact with other elements of the railway rolling stock [GOST 9238-2013 "Construction and rolling stock clearance diagrams"].

The term "V-Band" refers to the range of radio waves with frequencies from 40 to 75 GHz.

The term "E-Band" refers to the range of radio waves with frequencies from 71 to 76 GHz and from 81 to 86 GHz.

The term "W-Band" refers to the range of radio waves with frequencies from 75 to 110 GHz.

The term "F-Band" refers to the range of radio waves with frequencies from 90 to 140 GHz.

The term "D-Band" refers to the range of radio waves with frequencies from 110 to 170 GHz.

The term "IQ-signal" refers to a digital or analog signal represented in the form of in-phase and quadrature components of the signal.

The term "PLL" refers to Phase Locked Loop.

The term "PoE" refers to a standardized Power over Ethernet technology, according to which one device allows the transmission of electrical energy along with data to another device over a standard twisted pair cable in the Ethernet network.

The term "OSI network model" refers to the standardized network model of the OSI/ISO network protocol stack. Various network devices can interact with each other with the help of this model. The model defines different levels of system interaction. Each level (indicated by the prefix L and the number in the model designation) performs certain functions in this interaction.

The terms "head" and "tail" used for radio frequency modules conventionally reflect their spatial location on the train and the use of these terms depends only on the direction of train's movement. When the train moves in the opposite direction, the term "head module" can denote the module that was previously located in the conventional tail of the train, and vice versa, without changing the technical substance of this node.

Other explanations for this invention, its features and the problems it solves are disclosed comprehensively in the detailed description of its embodiments with reference to the drawings attached to the present description.

DRAWINGS SUMMARY

Figure 1B:
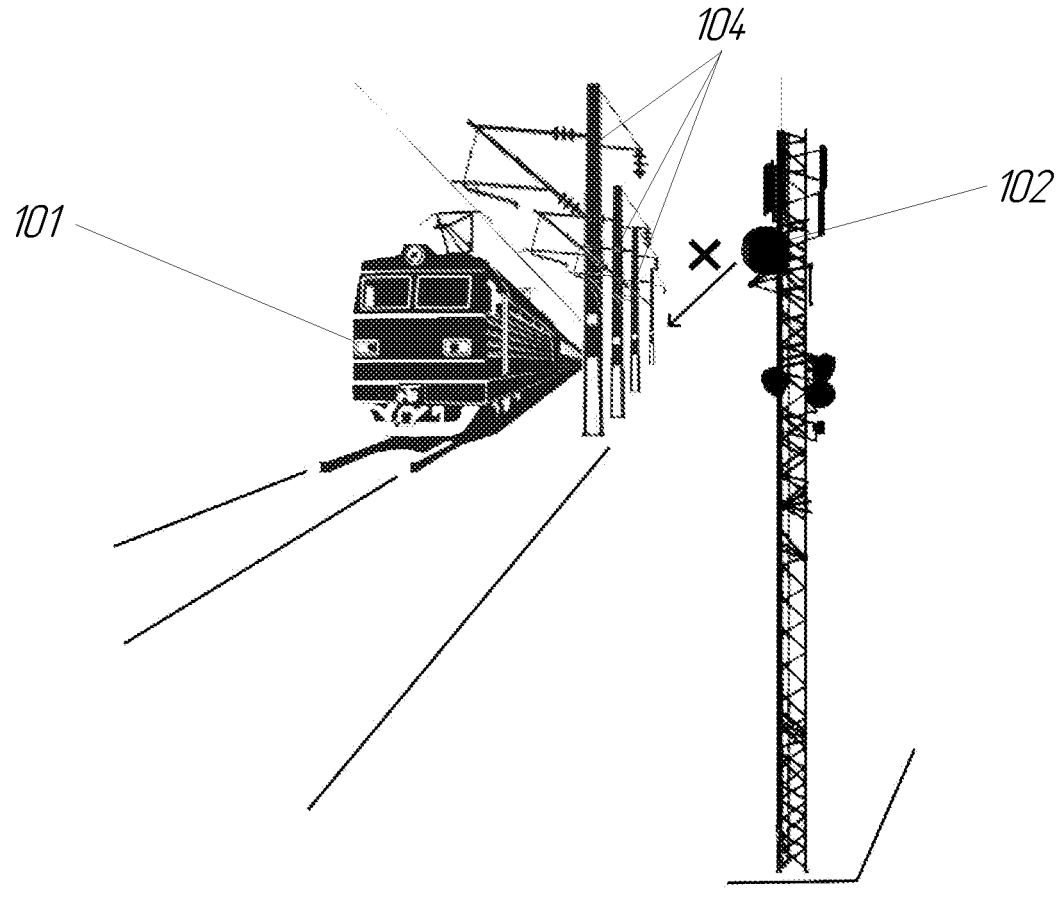
Figure 1C:
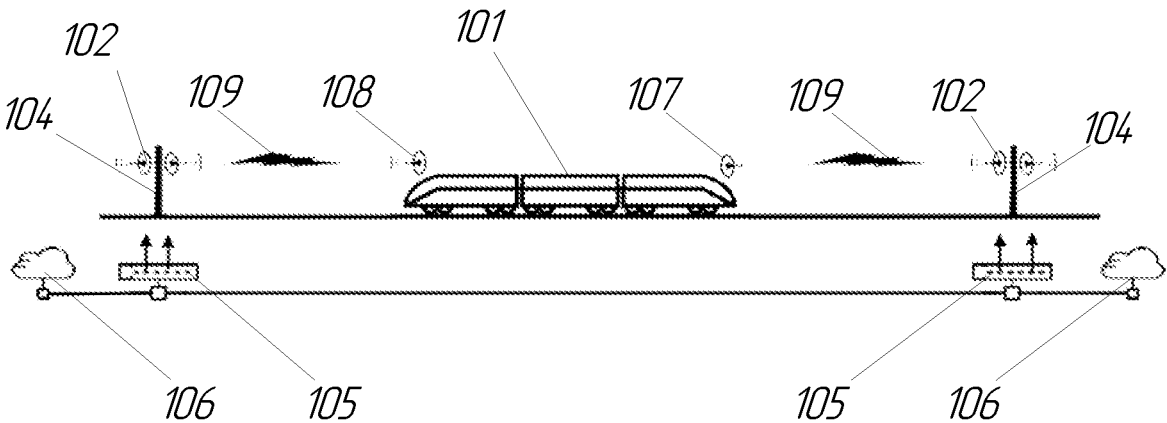
Figure 2:
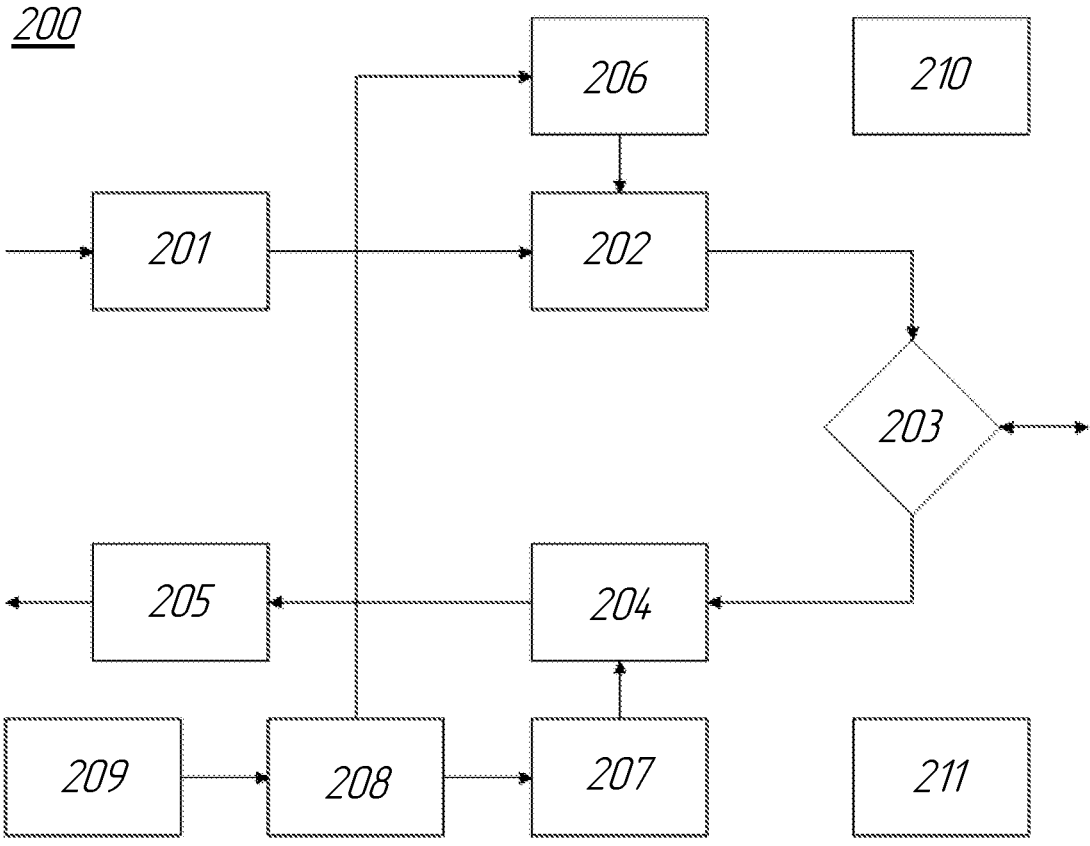
Figure 3:
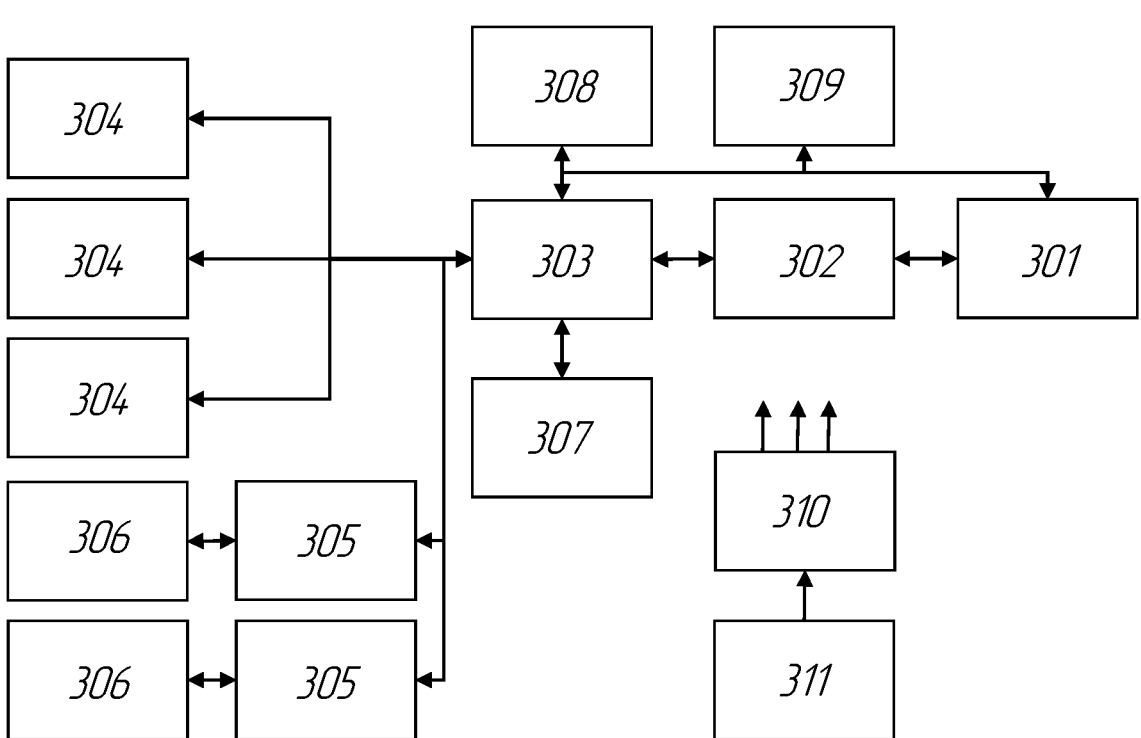
Figure 5A:
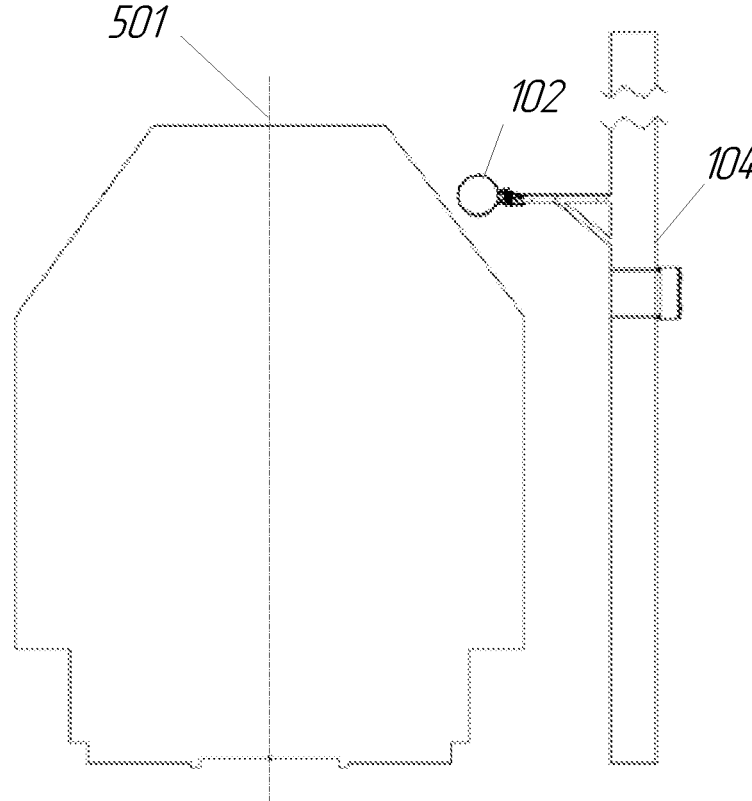
Figure 5B:
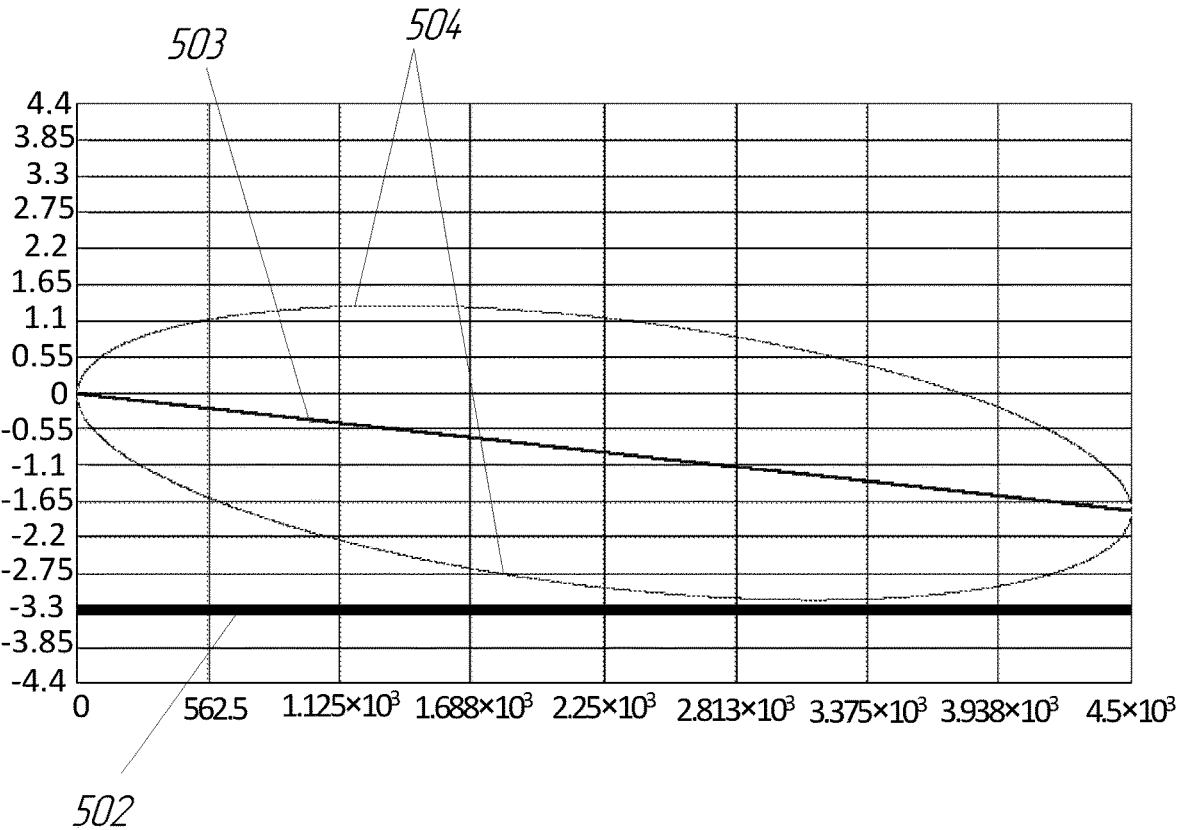
Figure 5C:
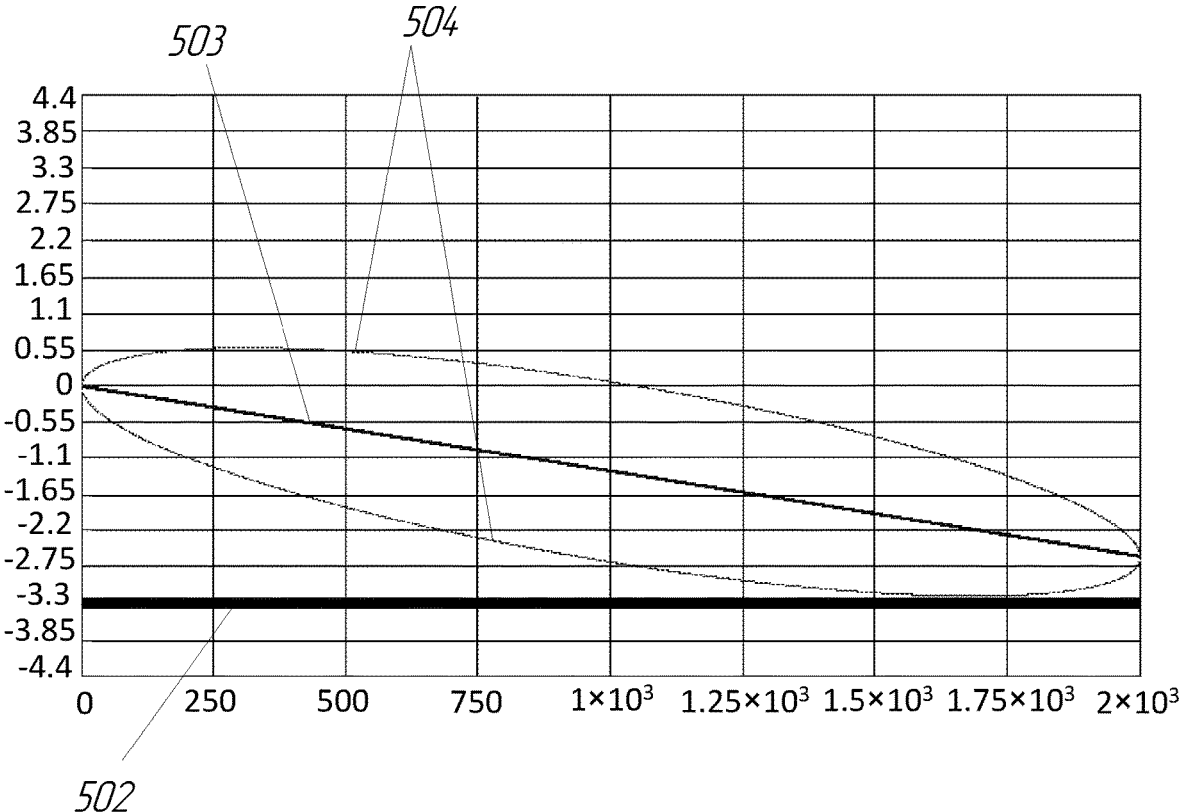
Figure 5D:
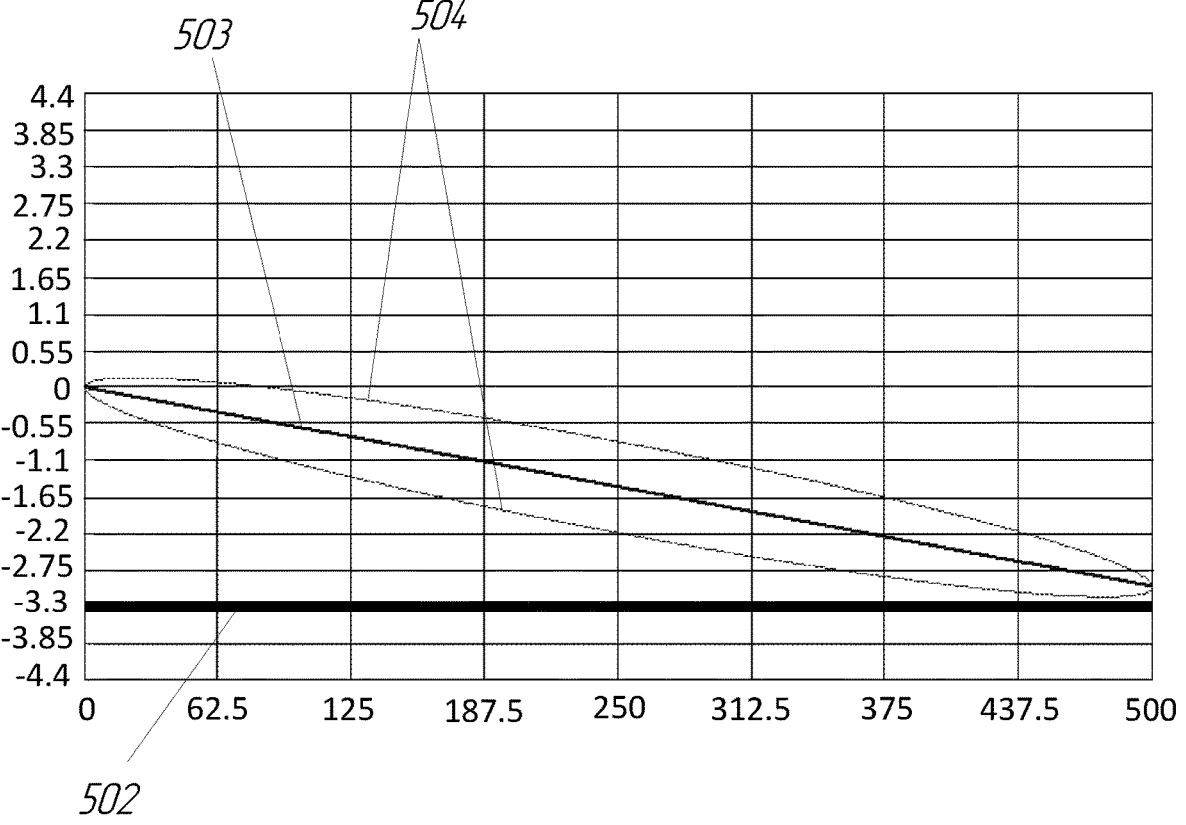
Figure 6:
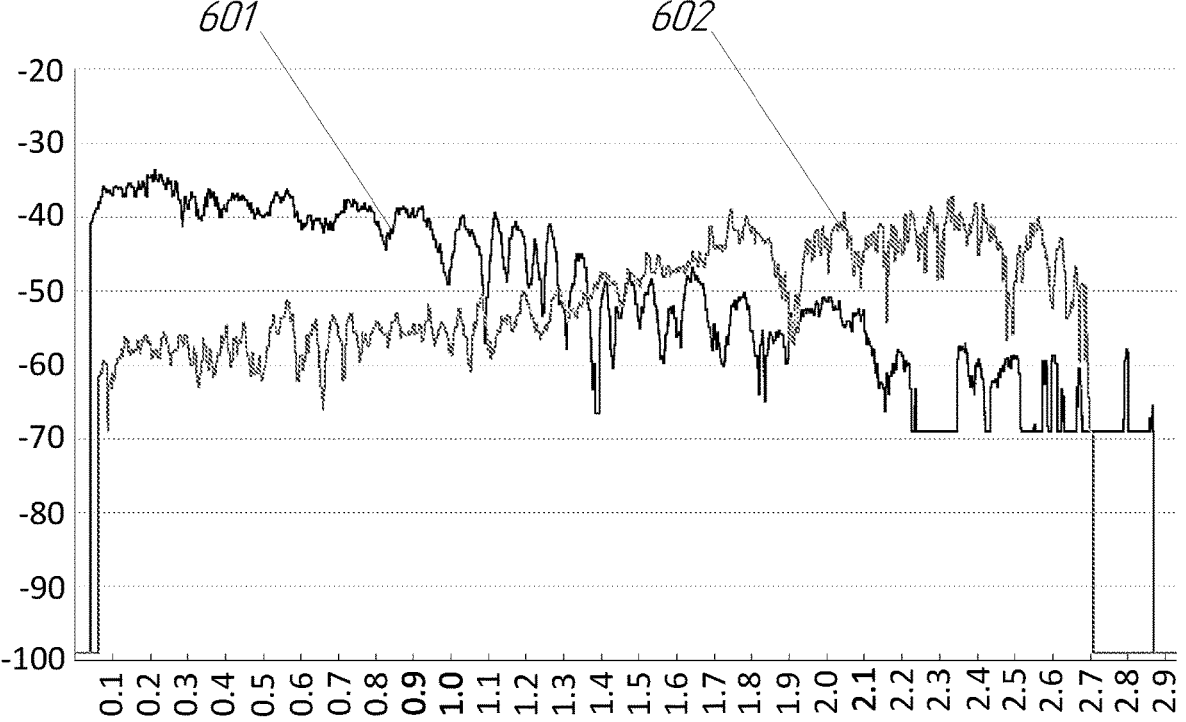

FIG. 1*a* and FIG. 1*b* present obstacles in the communication channel "train-to-ground";

FIG. 1*c* presents a diagram of establishing the communication channel "train-to-ground";

FIG. 2 and FIG. 3 present functional flowcharts of the radio frequency transceiver and routing module for the head and tail radio frequency modules and the base station;

FIG. 4*a* and FIG. 4*b* present flowcharts of methods for providing high-speed communication on a high-speed railway;

FIG. 5*a* presents an option of base station placement on the support of the overhead system;

FIG. 5*b*, FIG. 5*c*, FIG. 5*d* present design charts for the first Fresnel zone when the radio wave propagates along the railway;

FIG. 6 presents a diagram of the received signal strength for receivers installed on the train.

EMBODIMENT OF INVENTION

Description of embodiments of the invention can be used as an example for better understanding of its essence and is set out with reference to the figures. However, the details below are intended not to limit the essence of the invention, but only to make it clearer.

The invention is based on the technology of providing radio relay communication, which allows transmitting data over long distances with increased bandwidth capability of the established communication channel. In order to enable data transmission with increased bandwidth capability, the invention introduces base stations located close to the railway gauge along the route of the train. The space inside the railway gauge shall always be free according to the railway regulations. Such an arrangement of base stations allows for direct visibility between their antennas and the antennas of the radio relay modules installed on the train.

Since the desired data transmission rate of about 10 gigabits per second requires availability of free frequency bands with a width of several gigahertz, technically this can only be implemented in the millimeter wavelength range. In this case, it is necessary to maintain direct visibility, which is due to the nature of wave propagation in the millimeter wavelength range. At the same time, the requirement to provide a free zone within the first Fresnel zone during the propagation of a radio wave is important. Spatial outline of the first Fresnel zone is represented by a rotational ellipsoid, inside which all transmitted payload data is concentrated. FIG. 1a presents the case in which the base stations 102 are installed along the route of the train 101 on separate poles. When a wave propagates into the volume corresponding to the first Fresnel zone, there is no way to avoid obstacles 103 of natural (landscape, forest cover) or man-made (buildings, railway infrastructure, bridges, tunnels) type. In this case, in the absence of obvious obstacles 103 that arise on the path of wave propagation, the direct visibility for the base stations 102, installed beyond the distances at which the supports 104 of the high-voltage power infrastructure of the railway are located, will be limited by the supports 104 of this infrastructure themselves. FIG. 1b presents the effect of blocking direct visibility from a stand-alone base station 102 to the moving train 101. This effect will increase as the train 101 moves from the base station 102 and with the decrease of a visual angle from the base station 102 to the railway track. In this case, the row of supports 104 of the high-voltage infrastructure visually merges into a solid barrier in perspective.

The design of the base stations 102 includes antennas capable of emitting radio waves in the millimeter wavelength range. It is well known that millimeter waves belong to the radio wave range with a wavelength from 10 mm to 1 mm, which corresponds to frequencies from 30 GHz to 300 GHz. Millimeter radio waves have shorter wavelengths as compared with lower frequency bands. It makes possible to provide improved range and quality of radio communications over long distances when operating within an aisle formed by the supports 104 of the high voltage power wire suspension infrastructure, since the said first Fresnel zone occupies a volume that becomes more compact as wavelengths decrease. Eliminating the contact of the radio wave with the obstacles 103 occurred on the path of its propagation shall significantly reduce the probability of signal payload loss. Therefore, it is advisable to use as short wavelengths as possible. However, it should be noted that weather conditions can form an obstacle to the propagation of short radio waves. Its is known that millimeter radio waves pass through the fog well, so the use of shorter radio waves, such as visible light, which effectively attenuates in the fog, is not recommended. From this point of view, the most optimal solution is to use operating frequency bands such as V-Band, E-Band, W-Band, F-Band, D-Band, for which, on the one hand, commercial solutions have been developed, and on the other hand, waves in these ranges easily propagate through the fog.

In addition, the antennas used in the base stations 102 have a narrow beam pattern. All antennas are directed in the movement direction of the train 101, or in the opposite direction—to the train's head or tail. The present invention does not use antennas that are capable of radiating radio waves in directions other than along the train route, as is typically the case with LTE or Wi-Fi technologies. The narrow radiation pattern of the antennas used provides a significant concentration of radiation in a single given direction. Due to the focused, narrow beamwidth in this direction a large distance is achieved over which radio communication can be established in an efficient manner. The narrow beamwidth allows more precise emission of the radio signal in the direction of the train 101. The radiation pattern is a graphical representation of the relative field density emitted or received by the antenna. In addition, location of the base stations near the railway gauge results in narrow beam propagating without collisions with the railway infrastructure and interference with it.

Another distinctive feature of the invention is the use of radio frequency modules located in the tail and head of the train. It is necessary to ensure the guaranteed quality of the network connection between user devices and the external data transmission network. For example, it may happen that communication channel between the head module and the base station or between the tail module and the base station is lost. However, the case when two communication channels are interrupted simultaneously at different radio frequency modules is extremely unlikely or even almost impossible.

The recommended distance between base stations most likely providing steady communication channel with nominal speed 10 Gbps is 2 km. However, as it was already noted, this is a more efficient alternative than establishing communication channels between the moving train and a base station that supports LTE or Wi-Fi technologies. For example, in the case of Wi-Fi, the distances between base stations will be several tens of meters to provide a reliable communication channel. The cost of one piece of radio relay equipment exceeds the cost of one unit of Wi-Fi access point, but at the same time for longer distances the use of radio relay communication technologies becomes more cost-effective, less demanding to maintenance and more reliable. It should be noted that in all cases, the cost of equipment installation along the railway is quite high. At the same time, the technology that solves the problem of providing high-speed communication using a smaller number of pieces of equipment, in particular, base stations, becomes more cost-effective.

It should be noted that the proposed method and system do not require construction of a complex bulky infrastructure. The particularity of railway design is that overhead system supports are installed over long sections of the railway, and these supports take the load from cables suspended along the railway and special switching equipment installed. The claimed invention uses this particularity and propose to place radio relay base stations on the supports of the overhead system.

This invention is able to provide the longest distance of data transmission at the rate of up to 10 Gbps, but not limited to this value, on straight high-speed railway sections that represent a promising trend in the development of railway communication in Russia and are actively put into operation in Europe, Japan, China and many other developed countries of the world. It should be noted that trains operating on such railways are capable of accelerating from 300 to 400 km/h, which makes it even more difficult to use LTE and Wi-Fi technologies to provide communication with the train.

In accordance with FIG. 1c, the train 101 is moving on a high-speed section of the railway. There are overhead system supports 104 along the route of the train 101. Radio relay base stations 102 can be mounted on each or some supports 104. The distance between the base stations 102 is chosen based on relief particulars, typical weather conditions in the region, availability or absence of natural obstacles. For example, the base stations 102 may be placed every 1 km, 2 km, or 3 km from each other, but are not limited to these approximate distances. Preferably, the distance between the base stations is chosen in such a way that when establishing communication between them and the radio frequency modules of the train 101, the direct visibility condition is met, i.e. obstacles of various nature do not appear in the first Fresnel zone. Base stations 102 are placed at approximately the same distance from each other or at different distances selected from the group of indicative distances mentioned above.

Each base station 102 includes one or more radio modules. The radio module consists of a radio frequency transceiver with narrow-band antenna and, in some cases, a routing module. If the base station 102 contains several radio modules they can be included in the network and serviced by one common routing module, which can be both an integral part of such radio module and an external part for it, including being part of another radio module contained in the same base station. The base stations 102 are connected by a fiber optic communication line by means of switches 105 which provide network connection to the trunk infrastructure of the communications service provider 106. Preferably, the switches are selected so that to support the maximum data transmission rate supported by the radio modules. In particular embodiments, the network interfaces (ports) of each switch support a data exchange bandwidth with nominal value of 10 Gbps, or the switches are capable to increase their bandwidth by multiple increase of load from the transceivers of the radio modules. The connection of a set of nodes 102, 105, 106 forms an external data transmission network.

Minimum two head radio frequency modules 107 are installed in the head of the train 101; minimum two tail radio frequency modules 108 are installed in the tail of the train 101. Modules 107 and 108 are combined into the internal data transmission network of the train 101. Additionally, this network includes network switching equipment installed inside the cars of the train 101, capable of processing, converting, and exchanging data with modules 107 and 108. The said equipment provides wireless or wired access points for connecting user devices of passengers in the train 101 or service network devices, for example, video surveillance cameras. When following the route, the train 101 always appears to be between two base stations 102 located immediately ahead and behind the train 101. In one embodiment, the head module 107 establishes communication channel 109 with the nearest base station 102 ahead of it, and the tail module 108 establishes communication channel 109 with the nearest base station 102 behind it. However, particular embodiments are possible in which the radio frequency modules 107, 108 are configured in such a way as to be able to connect to the base stations 102 located both ahead of and behind the train 101, simultaneously or alternately.

The aggregated communication channel "train-to-ground" allows to solve the following problems of transmission of commercial, service network traffic:

provide access to broadband connection to the Internet;

provide access to audiovisual media content from remote network storages, including access to information about places of interest along the route of the train 101;

provide the opportunity for passengers to upload videos and visual content created on the road to social networks.

In addition, the train-to-ground communication channel allows for taking advantage of the following benefits of transferring service network traffic:

provide remote centralized video surveillance of the situation in the cars, detect incidents, for example, cases of fire;

provide real-time transmission of parameters from train control systems to the central control desk of the railway, provide feedback, for example, respond to an event by calling the remote emergency braking function.

In accordance with FIG. 2, the tail radio frequency module, the head radio frequency module and the base station contain radio frequency transceivers 200. The radio frequency transceiver 200 includes the transmission path implemented on a transmitter chip, onto which a corrector of IQ signals 201 and a converter of IQ signals to the millimeter range 202 are soldered. The receiving path is connected to a diplexer 203. The diplexer 203 is connected to the receiving path implemented on a receiver chip, onto which a converter of IQ signals from the millimeter range 204 and an amplifier of IQ signals 205 are soldered. The diplexer 203 connects the transmitting and receiving paths to each other.

One of the inputs of the amplifier 202 is connected to the output of a frequency synthesizer 206 with a PLL of local oscillator signals of the transmission path. One of the inputs of the converter 204 is connected to the output of the frequency synthesizer 207 with a PLL of local oscillator signals of the receiving path. The inputs of frequency the synthesizers 206, 207 are coupled to the outputs of the frequency synthesizer 208 of a reference quartz-locked oscillator 209 associated with it.

Frequency synthesizers 206 and 207 are capable of changing the operating frequency at the command of a control unit 210. A power filtering unit 211 provides the transceiver units with filtered power.

Analog Devices surface mount chips with waveguide inputs and outputs without the need for waveguide-to-coaxial transitions are preferably used to implement the transceiver as a whole.

The digital input of the radio frequency transceiver 200 receives the in-phase and quadrature components of the data radio signal. In the corrector 201, the parameters of the signal components are aligned so as to compensate for the non-identity of their paths. The signal enters the transmission path, in which the data signal is transferred to the E-band radio frequency range at the converter 202. The diplexer 203 connects the transmission and receiving paths to the antenna input/output, while galvanically decoupling them from each other. In the receiving path, the E-band radio frequency signal is converted into the in-phase and quadrature components of the information signal at the converter 204. In the amplifier 205, the level of the signal components is increased for their subsequent transmission to the modem.

The use of independent tuning of each of the I/I'/Q/Q' channels allows for developing a high-quality output spectrum without leakage of the local oscillator to the transmitter output. Digital adjustment of transmitter's output power and the gain of the receiver makes it possible to use the radio relay bridge both at extremely long distances and at short ones.

The frequency control of the transceiver 200 allows operation in the entire allocated frequency band from 71

GHz to 76 GHz and from 81 GHz to 86 GHz. The high degree of integration allows the transceiver to be placed in a small package as a complete device, equipped with IQ data, power and SPI control interfaces, assembled in one connector. The bandwidth of the transmitted signal is adjustable from 64.5 MHz to 2 GHz. The low phase noise of the local oscillator allows the use of the following types of modulations: BPSK, QPSK, 16 QAM, 32 QAM, 64 QAM, 128 QAM, 256 QAM. Minimum output power is 22 dBm. The receiver noise figure is not more than 5 dB. When used in combination with a 10 GbE Base-Band modem, the 200 transceiver provides a point-to-point radio relay communication channel with data transmission rate of up to 10 gigabits per second.

In accordance with FIG. 3, the tail radio frequency module, the head radio frequency module and the base station may contain routing modules 300. The routing module 300 includes consequentially connected modem unit 301, host controller 302, switch unit 303. The switch unit is connected with data interfaces represented by optical interfaces 10 GbE SFP+ 304, and with nodes 1 GbE PHY 305. Each of the nodes 305 is connected to the copper interface nodes 306. The switch unit 303 is also connected to the RAM node DDR3 307 and memory node NAND FLASH 312. The modem unit 301 and the switch unit 303 are also connected to the digital node PLL 309. The routing module is powered by a power supply unit 310. The power supply unit 310 is PoE capable and is connected to the PoE node 311. Although FIG. 3 does not clearly show the connection of the power supply unit 310 with other units and nodes of the module, in addition to the PoE node 311, it should be understood that the power supply unit provides power to all the units and nodes that require it. In various embodiments, the power supply unit 310 may provide power to other devices and nodes that are not incorporated into the routing module. In this case, the power supply unit 310, the modem unit 301 and the switch unit 303 are mounted on a common plate. This ensures the small size of the device and the possibility of its execution as a monoblock in a single sealed housing.

The modem unit 301 is based on the SoC MaxLinear digital signal processor, which allows implementing a comprehensive set of digital processing functions to ensure signal exchange with the radio frequency transceiver. Since it is assumed that the radio relay module with the routing module is intended for outdoor installation, for example, on the roof of buildings, the choice of such a multifunctional processor is feasible for reducing maintenance requirements and replacement interval of the components.

To enable the use of the routing module in radio relay communication lines, program instructions of the modem unit 301 may be able to implement one or more of the following options:

algorithm for compensating the non-linearity of the Predistortion transmission path, which makes it possible to achieve high output power of the transceiver at high modulations (128-QAM);
    an error correction algorithm in FEC signals, which improves the receiver sensitivity index at certain BERs;
    algorithm of adaptive modulation and bands of ACMB which allows automatic adjustment of radio operation mode to weather conditions, thereby increasing the availability factor of the radio relay communication line.

The host controller 2 is provided with program instructions for managing the software installed in the modem and switch units, ensuring microclimate inside the module casing, logging program activity of the module, and providing a administration graphical interface.

The switch unit 303 is implemented on a network processor with an internal bus capable of processing data at a of up to 120 gigabits per second. An example of such a processor would be a carrier class Marvell processor. In the absence of such data processing capacity, the use of a routing module would be difficult or almost impossible when used for a radio relay communication line. The switch unit 303 is provided with program instructions to support protocols above the second layer of the OSI network model. In a particular embodiment, the modem unit is capable of supporting an implementation of the L2+ layer protocols of the OSI model, i.e. functions of the second layer and above—switching and routing packets with VLAN support (Virtual Local Area Network), QoS (Quality of Service). In other particular embodiments, the named processor is capable of executing program instructions to support L3-L4 protocols. This makes the module scalable and configurable in a flexible manner.

The head radio frequency module, the tail radio frequency module and the base station are implemented in a single sealed casing of the radio relay module, which contains the radio frequency transceiver 200 and the routing module 300. It is possible that both devices are mounted on a common plate. In addition to the above devices, the radio frequency module may include additional components necessary for its operation. The ability to work via PoE eliminates the need to connect power cables to the module. The entire assembly can be powered via an Ethernet cable (twisted pair). This makes it possible to simplify and reduce the cost of installation and configuration of the structure.

In accordance with FIG. 4a, the method for providing high-speed communication on a high-speed railway is implemented as follows.

At step 401, short millimeter radio waves are emitted from the antennas of base stations (BS) 104 and the radio frequency (RF) modules 107 and 108 of the moving train 101. The radio relay antennas of the base stations 102 are configured so that to emit narrow beamwidth waves. In this case, the antennas are characterized by narrow beam. Although step 401 is listed first in the process flow of the method, it should be understood that radio waves are emitted from the equipment antennas of the train 101 and the base stations 102 continuously, regardless of whether the train 101 is in the coverage area provided by the base stations 102 and, in fact, simultaneously with the other steps in this method. Emission of radio waves from the antennas of the modules 107 and 108 can be carried out both to search for the nearest base station 102, and to exchange radio signals with the payload.

At step 402, at least one communication channel is established between the head module 107 and the nearest base station 102 ahead of it, while at least one communication channel is established between the tail module 108 and the nearest base station 102 behind it. Number of established channels is determined depending on the number of tail and head radio frequency modules 107, 108 and the radio modules incorporated into the base stations 102. Several backup communication channels may be arranged, so that, in particular, in case of losing one of the communication channels the network traffic can be transferred to the backup channel, or to multiply the data transmission rate. Communication channels between the base stations 102 and modules 107, 108 operate in full duplex mode with frequency multiplexing with the use of the FDD (Frequency Division Duplex) method.

To ensure the continuity of the connection when passing by each subsequent base station, a seamless roaming method is used, which in this invention is continuously implemented in steps 403 and 404.

At step 403, shortly before the train has passed by the base station 102 located ahead, at least one communication channel 109 is established between the head module 107 and the next base station 102 closest to it.

At step 404, after the train, namely its tail part, has passed by the base station that was located ahead, at least one communication channel 109 is established between the tail module 108 and the said base station 102. In one embodiment, the antennas of each of the head modules are oriented forward, in fact, in the same direction as the movement of the train, and the antennas of each of the tail modules are oriented, respectively, back. In this embodiment, when switching communication channels 109, one of the head modules 107 (backup) starts working with the base station 102 closest to it, and one of the head modules 107 (main) continues to work with the nearest base station until it is passed by the head part of the train 101. Similarly, communication channels can be switched between the tail modules 108 and the base stations 102. Thus, one of the tail modules 108 (backup) after passing by the base station 102, which was located ahead before passing, starts working with this station, and one of the tail modules 108 (main) continues to work with the previous base station 102.

The frequency plan is designed so that the adjacent sections of the distance between the base stations 102 have different frequencies and/or different polarizations: even sections with one frequency plan and/or polarization, odd sections with another frequency plan and/or polarization. The backup and main radio modules, both head 107 and tail 108, are also separated by frequency and polarization. This ensures simultaneous operation of the main and backup modules without their mutual interference at the sections in close proximity to the base stations 102, although for a very short time. The head module 107 and tail module 108 operate alternately, either in one frequency plan and polarization, being in even sections of the distance, or another, being in odd sections of the distance. Only shortly before the train has approached the base station 102 both the backup and main modules 107, 108 can operate simultaneously. In fact, switching the traffic route from one base station to the next occurs instantaneously, since the communication channel with the next base station has already been established and is ready to transmit traffic at a time when the train has not yet passed by the current base station 102.

Let us consider an example of switching communication channels between the base stations 102 and modules 107, 108. On a certain section of the railway, the train 101 is located between the first and second base stations 102, which are in close proximity to the train. Since the head of the train 101 and its tail do not pass by the second base station simultaneously, but with some delay, then for a short time of switching the head module 107 to the third base station 102, communication will be provided through the communication channel between the tail module 108 and the first base station 104. And then, when connection between the head module 107 and the third base station 102 has already been established, the moment of switching of the tail module 108 to the second base station 102 occurs. Thus, both channels are used during the main time period of train movement between the base stations, and the traffic is aggregated. Only during short time periods of switching of the head 107 or tail modules 108, and non-simultaneously, only one communication channel, tail or head, respectively, is used.

Steps 403 and 404 are cycled until the train 101 passes the last base station 102 that the modules 107, 108 could connect along the route of the train 101.

In accordance with FIG. 4b, in another embodiment, the antenna of the first head module 107 and the antenna of the first tail module 108 are oriented backward, in fact, in the same direction as the movement of the train. The antennas of the second radio modules in pairs 107 and 108 are oriented forward, respectively. At step 405, following step 401 in this case, a communication channel is established between the first head module and the base station located behind the train 101 and the first tail module 108 and the same base station 102. Simultaneously, a communication channel is established between the second head module 107 and the nearest base station 102 located ahead of the train 101. Before the first channel switching, the first modules 107 and 108 are connected to the same base station 102 located behind the train 101, and the second head module 107 is connected to the base station located ahead. As this base station 102 approaches, the second head module 107 sends a signal to the second tail module 108 shortly before the head of the train has passed by, requesting it to connect to this base station 102. When the train 101 passes by the base station ahead, the first head module 107, which antenna is oriented backward, establishes a communication channel with it, and the first tail module 108, which antenna is also oriented backward, continues to operate with the previous base station until it is possible to establish a communication channel with the next base station 102, which will happen after it is passed by the tail part of the train 101. The second tail module 108, after the tail of the train has passes the base station 104 with which it has a communication channel, proceeds to wait for the request to connect to the next base station 102. In this embodiment, the distances between the first and second modules 107, 108 and the base stations are smaller than in the embodiment, presented above.

Before the second channel switching, the first head module 107 and the first tail module 108, the antennas of which are oriented backward, have repeated step 405 and operate with the base station 102 located behind the train, the second head module 107, which antenna is oriented forward, has repeated step 406 and operates with the base station 102 closest to it. Shortly before the head of the train has passed by the base station, the second tail module 108, the antenna of which is also oriented forward, repeats step 407 and connects to the base station with which the second head module 107 is currently operating.

Before each subsequent channel switching, modules 107, 108 repeat steps 405, 406, 407 in a similar way until the train 101 has passed by the last base station 102 to which at least one of the said modules could connect along the route of the train 101. At step 408, the switching equipment of the internal data transmission network of the train 101, processes the signals from the modules 107, 108 and provides access of user devices to the external data exchange network. It should be noted that step 408 is not the next step after completion of step 404, but is implemented in parallel with steps 402, 403, 404 in accordance with the flowchart shown in FIG. 4a. Step 408 is also implemented in parallel with steps 405, 406, 407 in accordance with the flowchart shown in FIG. 4b.

FIG. 5a presents the location of the base stations 102, installed on the supports 104 of high-voltage infrastructure, at a certain distance from the central axis of the railway gauge 501. Let us consider the cases in which the distances between the base station 102 and the axis 501 are different.

FIG. 5*b*, FIG. 5*c*, FIG. 5*d* show a graphical representation of the first Fresnel zone when a radio wave propagates along the railway track, where the values for the distance between the radio transmitter and the radio receiver are marked on the horizontal axis, the values for the distances between the center of the railway track and the supports of the overhead system are marked on the vertical axis, wherein on the vertical axis 0 corresponds to the central axis 501 of the railway track, line 502 passing through the value −3.3 m indicates the location of the overhead system poles relative to the axis 501. The direction of the beam from the receiver (the point on the right vertical boundary of the diagram) to the transmitter (the point on the left vertical boundary of the diagram) corresponds to line 502. The first Fresnel zone is an ellipse bounded on the diagram by lines 504. The best signal stability and transmission quality are achieved when no obstacles enter the first Fresnel zone, which means that boundary 504 of this zone must not touch or cross line 502 passing through the value −3.3 m, on which the overhead system supports are located.

FIG. 5*b* presents the case of calculating the first Fresnel zone, in which the base station antenna is placed as close as possible to the railway gauge, at a distance of 1.8 m from the central axis 501. This ensures the maximum communication range without interference with high-voltage infrastructure supports. It can be seen from the diagram that it is approximately 4.5 km, i.e. the direct visibility condition within the distance between the receiver and the transmitter is met.

FIG. 5*c* presents the case of calculating the first Fresnel zone, in which the base station antenna is located at a distance of 2.6 m from the central axis 501. In this case, the distance between the receiver and the transmitter, at which the first Fresnel zone comes closest to the infrastructure poles, corresponds to 2 km.

FIG. 5*d* presents the case of calculating the first Fresnel zone, in which the base station antenna is placed as close as possible to the infrastructures' supports, at a distance of 3.0 m from the central axis 501. The maximum distance at which the first Fresnel zone remains free is about 500 meters.

The design values for the Fresnel zone presented above can be used when choosing the distances between base stations along the route of the train.

FIG. 6 presents the received signal strength for the radio frequency modules of the train. The vertical axis corresponds to the value of the received signal strength in dBm, the horizontal axis corresponds to the distance between the base stations in kilometers. Line 601 on the diagram represents the signal strength between the tail module 108 and the base station behind the train 101. Line 602 on the diagram represents the signal strength between the head module 107 and the base station ahead of the train 101.

Line 601 represents gradual wave-shaped attenuation of the signal as the train 101 moves away from the base station 102 behind it. Line 602 represents gradual wave-shaped attenuation of the signal as the train approaches the base station 102 ahead of it. The sinusoidal character may be attributed to addition of the main signal and the signal reflected from the ground surface. The form of the diagram corresponds to calculated predictions.

The above embodiments are intended to demonstrate the solution of the following particular technical problems:

providing the nominal speed of 10 Gbps in the communication channel of "train-to-ground" class through the use of radio waves in the short millimeter wave range;

observance of the direct visibility condition between the base stations located along the route of the train and the radio frequency modules installed on the train, which is necessary to ensure their operation in the short millimeter range;

compliance with regulatory requirements for the construction of railway infrastructure regarding the prohibition to install third-party equipment within the railway gauge, by means of installing base stations near the railway gauge;

elimination of obstacles for millimeter waves during their propagation along the railway infrastructure by reducing the first Fresnel zone;

ensuring operation in the commercially developed bands (V-Band, E-Band, W-Band, F-Band, D-Band) through the use of the appropriate component base for base stations and radio frequency modules.

It should be understood that the above embodiments of the invention are merely illustrative and should not be construed as limiting the essence of the invention. The invention can be supplemented with other details, properties, modifications without deviating from its essence expressed in primary claims and clarified by dependent claims.

The invention claimed is:

1. A method for providing high-speed communication on a high-speed railway, in which base stations connected to an external data transmission network are installed along a route of a train, equipped with narrow beam antennas and are capable of communicating with head and tail radio frequency modules installed on the train, equipped with narrow beam antennas and integrated into an internal data transmission network, wherein a location of the base stations relative to a railway gauge provides for direct visibility between the antennas of the base stations and the antennas of the radio frequency modules installed on the train, and wherein a pre-determined distance between base stations is selected in accordance with a corresponding first Fresnel Zone calculation, the first Fresnel zone being free of obstacles the method includes the following steps:

emit radio waves in a range of short millimeter waves on the antennas of the base stations and the radio frequency modules of a moving train;

establish a communication channel between a first head module and the base station closest to said first head module located ahead and a communication channel between a first tail module and the base station closest to said tail module located behind;

before the train has passed by the base station located ahead, a communication channel is established between a second head module and a next base station closest to the train;

after the train's tail part has passed by the base station, which was located ahead of the train, a communication channel is established between a second tail module and this base station;

with radio signals, an exchange of which is carried out through the established communication channels, processed on a switching equipment connected with the radio frequency modules, and an access of network devices on the train to the external data transmission network is provided.

2. The method according to claim 1, wherein the antennas of the first and the second head modules are oriented in the direction of the base stations ahead of the moving train, and the antennas of the first and second tail modules are oriented in the direction of the base stations behind the train.

3. The method according to claim 1, wherein the antennas of the base stations are tuned to emit narrow beamwidth waves.

4. The method according to claim 1, wherein the communication channels between the base stations and the modules installed on the railway train are set in full duplex mode with frequency and polarization multiplexing.

5. The method according to claim 1, wherein radio waves are emitted in one of the radio frequency bands selected from the group V-Band, E-Band, W-Band, F-Band, D-Band.

6. A method for providing high-speed communication on a high-speed railway, in which base stations connected to an external data transmission network are installed along a route of the train, the base stations being equipped with narrow beam antennas and being capable of communicating with head and tail radio frequency modules installed on the train, the head and tail radio frequency modules being equipped with narrow beam antennas and integrated into an internal data transmission network, the base stations location relative to the railway gauge provides for direct visibility between the antennas of the base stations and the antennas of the radio frequency modules installed on the train, and wherein a pre-determined distance between base stations is selected in accordance with a corresponding first Fresnel Zone calculation, the first Fresnel zone being free of obstacles, the method includes the following steps:

emit radio waves in the range of short millimeter waves on the antennas of the base stations and the radio frequency modules of a moving train;

establish communication channels between a first head module, a first tail module and the base station closest to them located behind, while establishing a communication channel between a second head module and a nearest base station located ahead;

before the train head has passed by the base station located ahead, a communication channel is established between a second tail module and this base station located ahead of the train tail, with which the second head module was in communication;

with radio signals, an exchange of which is carried out through the established communication channels, processed on a switching equipment connected with the radio frequency modules, and an access of network devices on the train to the external data transmission network is provided.

7. The method according to claim 6, wherein the antennas of the first head and first tail modules are oriented towards the base stations located behind the moving train, and the antennas of the second head and second tail modules are oriented towards the base stations located ahead of the train.

8. A system for providing high-speed communication on a high-speed railway, which includes internal and external data exchange networks, wherein the internal network combines tail radio frequency modules installed on a tail of the train, equipped with narrow beam antennas, head radio frequency modules installed on a head of the train, equipped with narrow beam antennas, and switching equipment capable of processing signals from the head radio frequency modules and the tail radio frequency modules and providing connected network devices with access to the external data exchange network;

the external data exchange network combines base stations with narrow beam antennas, wherein the base stations are able to establish communication with the tail radio frequency modules and head radio frequency modules of the train and are installed along a route of the train in such a way that the location of the base stations relative to a railway gauge provides for direct visibility between the narrow beam antennas of the base stations and the narrow beam antennas of the radio frequency modules installed on the train;

wherein a pre-determined distance between base stations is selected in accordance with a corresponding first Fresnel Zone calculation, the first Fresnel zone being free of obstacles, wherein the narrow beam antennas of the base stations and the radio frequency modules installed on the train are tuned to emit radio waves in a range of short millimeter waves.

9. The system according to claim 8, wherein the antennas of the head frequency modules are oriented in the direction of the base stations ahead of the moving train, and the antennas of the tail frequency modules are oriented in the direction of the base stations behind the train.

10. The system according to claim 8, wherein the antennas of a first head module and a first tail module are oriented in the direction of the base stations ahead of the moving train, and the antennas of a second head module and a second tail module are oriented in the direction of the base stations behind the train.

11. The system according to claim 8, wherein the base stations are placed on supports of the railway overhead system.

12. The system according to claim 8, wherein the base stations are placed on the supports between the boundary of the railway gauge and nearest supports of the railway overhead system.

13. The system according to claim 8, wherein the base stations are networked by fiber-optic communication line.

14. The system according to claim 8, wherein each base station and each of the radio frequency modules installed on the train consists of several devices that provide switching, routing, reception and transmission of radio signals.

* * * * *